US00RE46475E

(19) United States
(12) Reissued Patent
Yamakami et al.

(10) Patent Number: US RE46,475 E
(45) Date of Reissued Patent: Jul. 11, 2017

(54) ELECTRICAL CONNECTOR FOR ELECTRICAL CONNECTION BETWEEN NEIGHBORING CONNECTORS

(71) Applicant: FUJITSU COMPONENT LIMITED, Tokyo (JP)

(72) Inventors: Toru Yamakami, Tokyo (JP); Manabu Shimizu, Tokyo (JP)

(73) Assignee: FUJITSU COMPONENT LIMITED, Tokyo (JP)

(21) Appl. No.: 14/086,273

(22) Filed: Nov. 21, 2013

Related U.S. Patent Documents

Reissue of:
(64) Patent No.: 8,062,071
Issued: Nov. 22, 2011
Appl. No.: 13/048,181
Filed: Mar. 15, 2011

(30) Foreign Application Priority Data

Mar. 31, 2010 (JP) ..... 2010-082790
Nov. 25, 2010 (JP) ..... 2010-262942

(51) Int. Cl.
*H01R 24/00* (2011.01)
*H01R 12/72* (2011.01)
*H01R 13/514* (2006.01)

(52) U.S. Cl.
CPC ..... *H01R 12/721* (2013.01); *H01R 13/514* (2013.01)

(58) Field of Classification Search
CPC ..... H01R 12/721; H01R 13/514
USPC ..... 439/541.5, 629–637, 325–328, 928, 567, 439/76.1
See application file for complete search history.

(56) References Cited

U.S. PATENT DOCUMENTS

| | | | | | |
|---|---|---|---|---|---|
| 3,239,798 | A * | 3/1966 | Silver | 439/631 |
| 4,623,207 | A * | 11/1986 | Sasaki et al. | 439/59 |
| 4,897,054 | A * | 1/1990 | Gilissen et al. | 439/631 |
| 5,186,632 | A * | 2/1993 | Horton et al. | 439/67 |
| 5,399,105 | A * | 3/1995 | Kaufman et al. | 439/607.19 |
| 5,484,295 | A * | 1/1996 | Mowry et al. | 439/66 |
| 6,038,130 | A * | 3/2000 | Boeck et al. | 361/735 |
| 6,086,427 | A * | 7/2000 | Cahaly | 439/631 |
| 6,116,957 | A * | 9/2000 | Mickievicz et al. | 439/631 |
| 6,409,521 | B1 * | 6/2002 | Rathburn | 439/66 |
| 6,604,950 | B2 * | 8/2003 | Maldonado et al. | 439/66 |
| 6,692,310 | B2 * | 2/2004 | Zaderej et al. | 439/701 |
| 6,699,068 | B2 * | 3/2004 | Wu | 439/541.5 |
| 6,811,434 | B2 * | 11/2004 | Wu | 439/567 |
| 7,214,069 | B2 * | 5/2007 | Rathburn | 439/66 |

(Continued)

FOREIGN PATENT DOCUMENTS

| | | | |
|---|---|---|---|
| JP | S50-27383 | U | 3/1975 |
| JP | S53-158893 | U | 12/1978 |
| JP | 02-073082 | U | 6/1990 |

(Continued)

*Primary Examiner* — Anjan Deb
(74) *Attorney, Agent, or Firm* — IPUSA, PLLC

(57) ABSTRACT

A connector for a first wiring board of a first module type apparatus and a second wiring board of a second module type apparatus, the connector providing electrical connection between the first wiring board of the first module type apparatus and the second wiring board of the second module type apparatus when the first module type apparatus and the second module type apparatus are engaged with each other, the connector includes a housing; a first terminal; and a second terminal.

9 Claims, 9 Drawing Sheets

(56) References Cited

U.S. PATENT DOCUMENTS

| | | | | |
|---|---|---|---|---|
| 7,613,011 | B2 * | 11/2009 | Grundy et al. | 361/785 |
| 2003/0060085 | A1 * | 3/2003 | Reece | 439/630 |

FOREIGN PATENT DOCUMENTS

| | | |
|---|---|---|
| JP | H03-109284 U | 11/1991 |
| JP | H08-222294 | 8/1996 |
| JP | 2003-317836 | 11/2003 |
| JP | 2006-330805 | 12/2006 |

* cited by examiner

ELECTRICAL CONNECTOR FOR ELECTRICAL CONNECTION BETWEEN NEIGHBORING CONNECTORS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This patent application is based upon and claims the benefit of priority of Japanese Patent Application No. 2010-082790 filed on Mar. 31, 2010 and Japanese Patent Application No. 2010-262942 filed on Nov. 25, 2010, the entire contents of which are incorporated herein by reference.

BACKGROUND OF THE INVENTION

1. Field of the Invention The present invention generally relates to connectors.

2. Description of the Related Art

Connectors provided in each module of plural-module type apparatuses, where the connectors are electrically connected to each other, have been conventionally suggested. See, for example, Japanese Patent Application Laid-Open Publication No. 2006-330805).

In the meantime, in a related art connector, electrical connection between neighboring connectors is made via a socket. Therefore, since a direction in which the connector is connected to a board and a direction in which the connectors are connected to each other are different from each other, it is not easy to arrange the connectors. In particular, in a case where the direction in which the connector is connected to a board and the direction in which the connectors are connected to each other are different at approximately 90 degrees, it is especially not easy to arrange the connectors.

SUMMARY OF THE INVENTION

Accordingly, embodiments of the present invention may provide a novel and useful connector solving one or more of the problems discussed above.

More specifically, the embodiments of the present invention may provide a connector which can be easily provided at a board, the connector having a structure whereby plural connectors can be easily connected to each other.

Another aspect of the embodiments of the present invention may be to provide a connector for a first wiring board of a first module type apparatus and a second wiring board of a second module type apparatus, the connector providing electrical connection between the first wiring board of the first module type apparatus and the second wiring board of the second module type apparatus when the first module type apparatus and the second module type apparatus are engaged with each other, the connector including:

a housing, the housing including a plurality of first grooves, a plurality of second grooves, the second grooves being formed in the same direction as a longitudinal direction of the first grooves, a first contact surface which comes in contact with another connector neighboring an end part side of the first grooves, and a second contact surface which comes in contact with another connector neighboring an end part side of the second grooves;

a first terminal received in the first groove, the first terminal being bent between a first end and a second end, the first terminal including a projecting part, the projecting part being situated at the first end side, the projecting part being configured to project from the first contact surface of the housing, and a plate spring where the second end is connected to a wiring of the board; and a second terminal received in the second groove, the second terminal being bent between a first end and a second end, the first end being provided in the vicinity of the second contact surface of the housing, the second end being connected to the wiring of the board.

Other aspect of the embodiments of the present invention may be to provide a connector adaptor provided at the first contact surface side or the second contact surface side of the housing of the connector as claimed in claim 1, the connector adaptor comprising:

a housing body, the housing body, including a plurality of grooves, a side contact surface which comes in contact with the connector neighboring a first end part of the grooves, another side contact surface which comes in contact with the connector neighboring a second end part of the grooves; and a terminal received in the groove, which terminal comes in contact with the first terminal or the second terminal of the connector at the side contact surface or the other side contact surface of the housing body.

According to the embodiments of the present invention, it is possible to provide a connector which can be easily provided at a board, the connector having a structure whereby plural connectors can be easily connected to each other.

Additional objects and advantages of the embodiments are set forth in part in the description which follows, and in part will become obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 2(A) is a partial and expanded perspective view showing an upper surface side of a connector 100; FIG. 2(B) is a partial and expanded perspective view showing a bottom surface side of the connector 100; and FIG. 2(C) is an expanded side view showing a first terminal 120 and a second terminal 130;

FIG. 5(A) is a partial and expanded perspective view of the connector 200; and FIG. 5(B) is an expanded side view showing the first terminal 120 and the second terminal 130).

FIG. 6(A) is a perspective view showing an upper surface side of the connector adaptor 300; FIG. 6(B) is a perspective view showing a bottom surface side of the connector adaptor 300; FIG. 6(C) is a front view of the connector adaptor 300; and FIG. 6(D) is a side view of the connector adaptor 300;

DETAILED DESCRIPTION OF THE PREFERRED EMBODIMENTS

Figure 1:
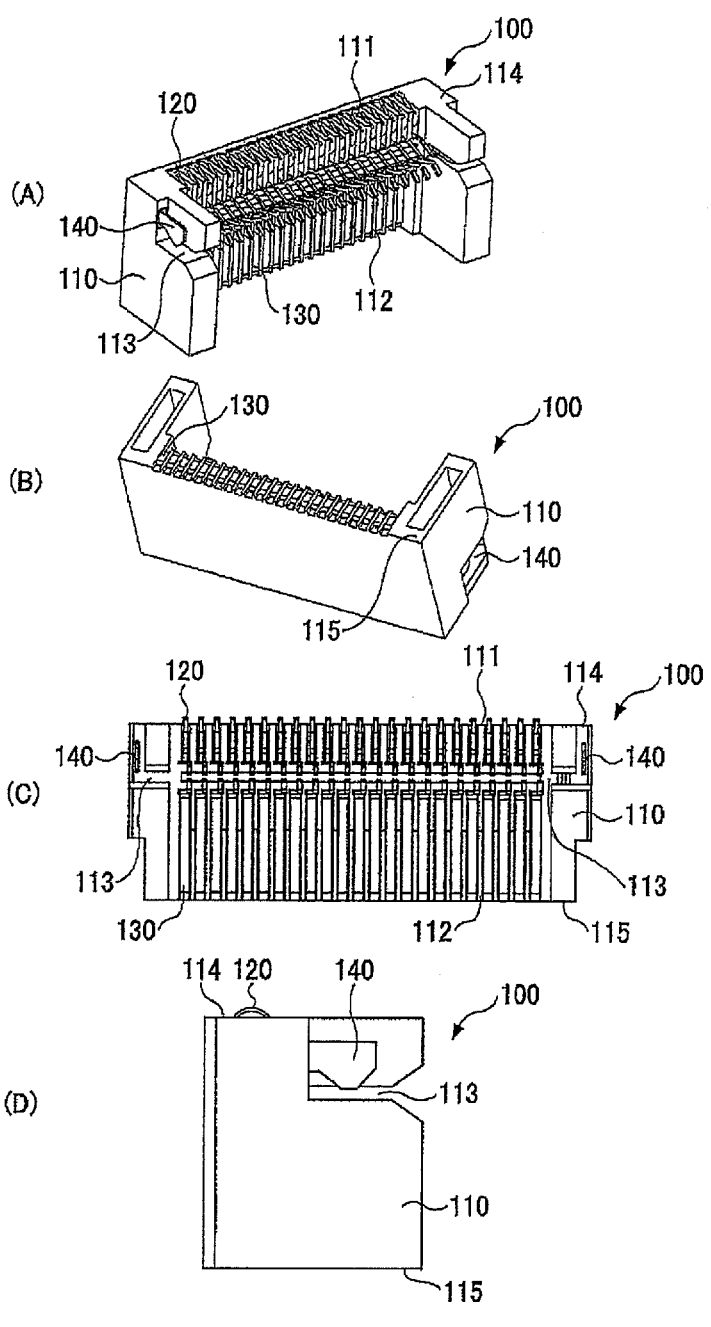
FIGS. 1(A)-1(D) are views showing a connector of a first embodiment of the present invention.
Figure 2:
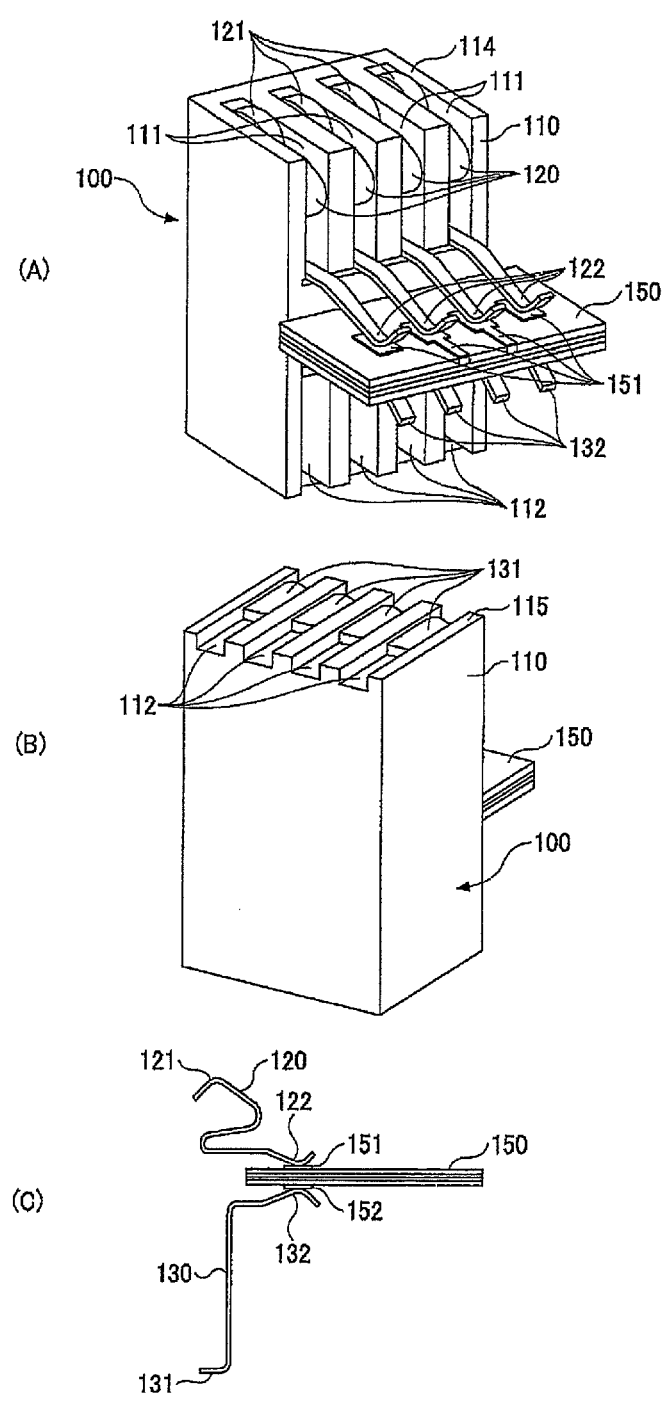
FIGS. 2(A)-2(C) are views of the connector of the first embodiment of the present invention where
Figure 3:
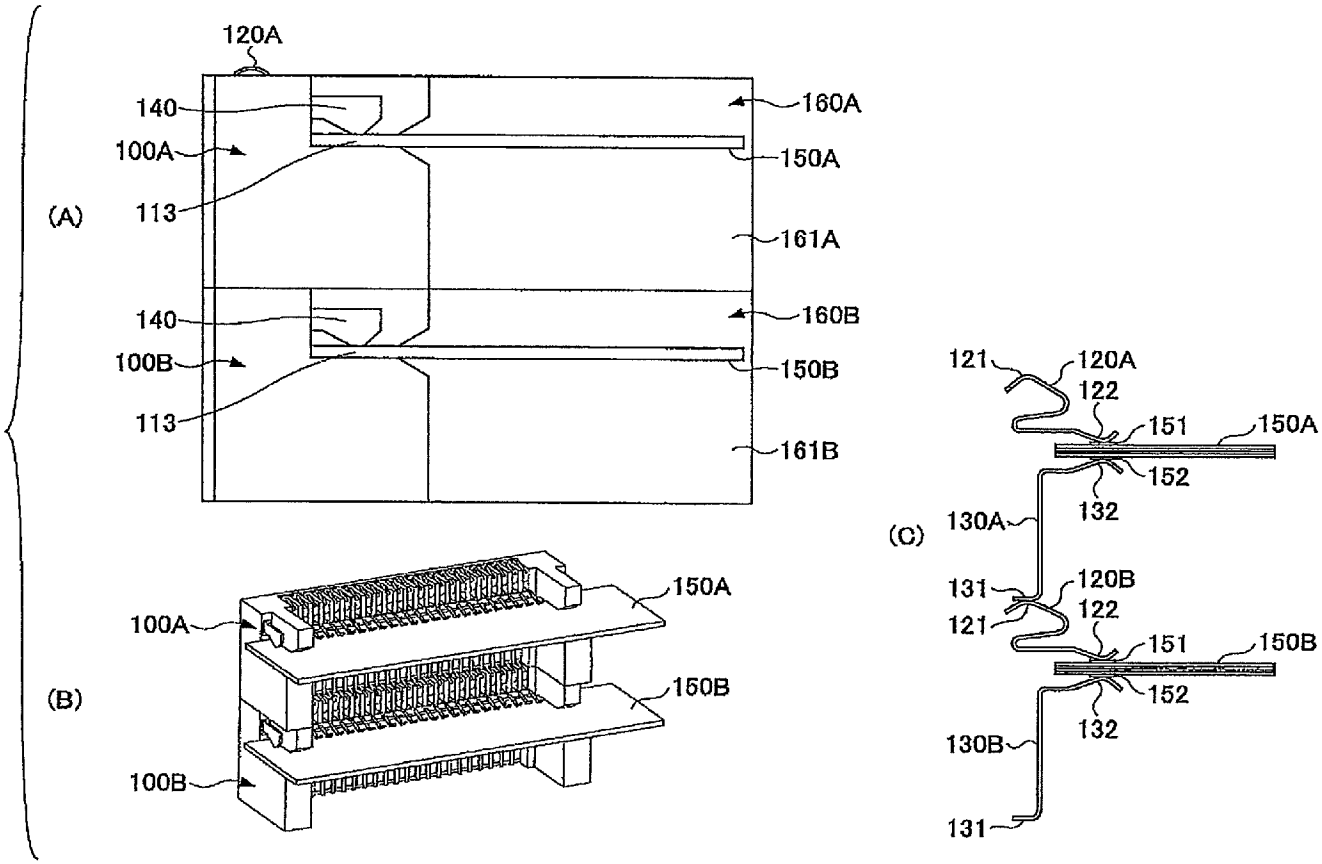
FIGS. 3(A)-3(C) are views showing an arrangement state of the connectors 100.
Figure 4:
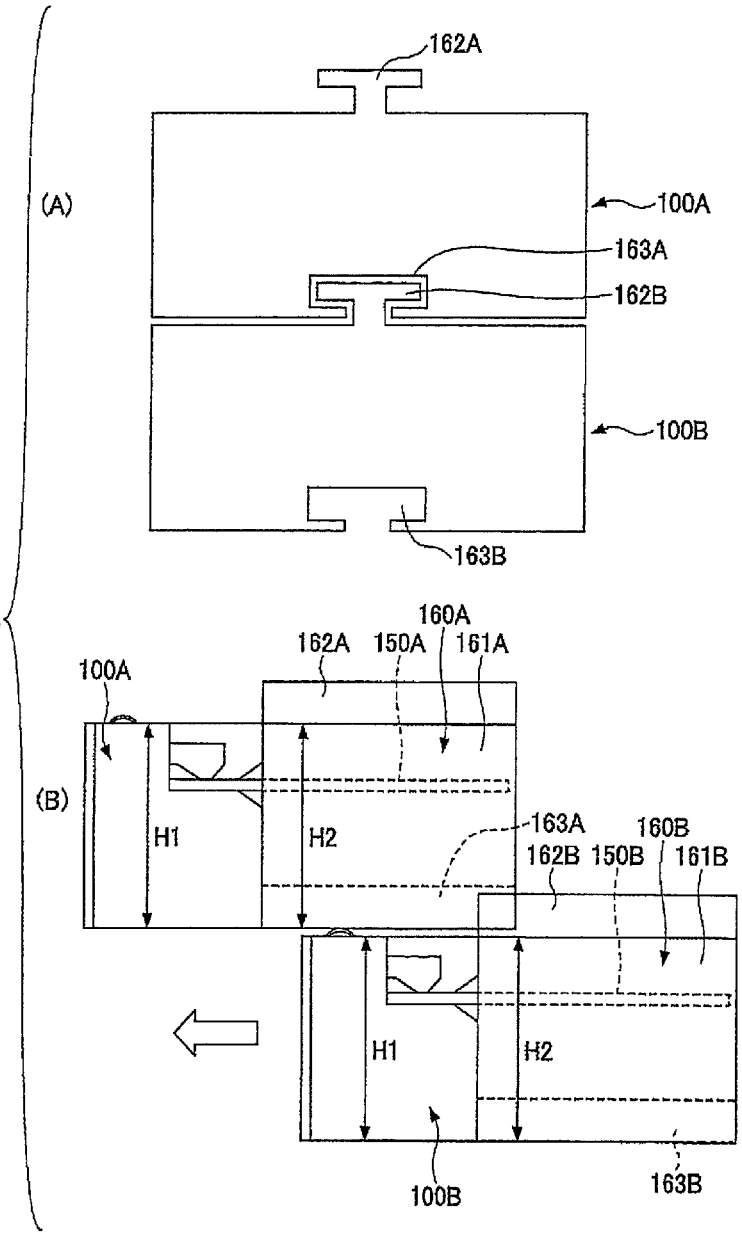
FIGS. 4(A) and 4(B) are views for explaining an arrangement method of a module type apparatus 160 including the connector 100.
Figure 5:
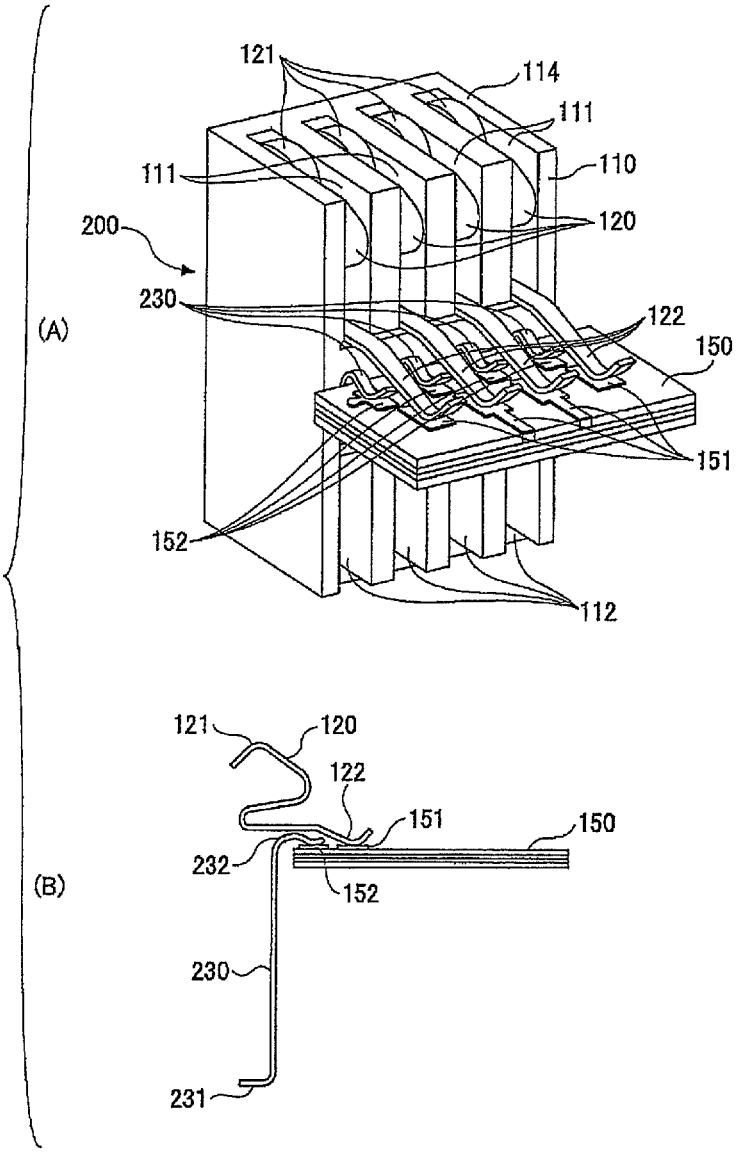
FIGS. 5(A) and 5(B) are views of a connector 200, where

A description is given below, with reference to the FIG. 1(A) through FIG. 5(B) of embodiments of the present invention.

First Embodiment

FIGS. 1(A)-1(D) are views showing a connector 100 of a first embodiment of the present invention. More specifically, FIG. 1(A) is a perspective view showing an upper surface side of the connector 100. FIG. 1(B) is a perspective view showing a bottom surface side of the connector 100. FIG. 1(C) is a front surface view of the connector 100. FIG. 1(D) is a side surface view of the connector 100. FIGS. 2(A)-2(C) are other views of the connector 100 of the first embodiment of the present invention. More specifically, FIG. 2(A) is a partial and expanded perspective view showing the upper surface side of the connector 100. FIG. 2(B) is a partial and expanded perspective view showing the bottom surface side of the connector 100. FIG. 2(C) is an expanded side view showing a first terminal 120 and a second terminal 130.

The connector 100 of the first embodiment of the present invention includes a housing 110, plural of the first terminals 120, plural of the second terminals 130, and fixing members 140.

The housing 110 is, for example, formed by integrally molding with an insulation material such as resin. The housing 110 includes plural first grooves 111, plural second grooves 112, and a guide groove 113.

The first grooves 111 are formed in parallel with each other. Similarly, the second grooves 112 are formed in parallel with each other.

Longitudinal directions (vertical directions in FIG. 1(C) and FIG. 2(A)) of the first grooves 111 are the same as longitudinal directions (vertical directions in FIG. 1(C) and FIG. 2(A)) of the second grooves 112. The number of the first grooves 111 is the same as that of the second grooves 112. As shown in FIG. 2(A), the first grooves 111 are formed at an upper side of a position where a board 150 is held, and the second grooves 112 are formed at a lower side of the position where the board 150 is held.

The guide groove 113 is formed, in a direction perpendicular to the longitudinal directions of the first grooves 111 and the second grooves 112, between an area where the first grooves 111 are provided and an area where the second grooves 112 are provided. The guide groove 113 is configured to guide the board 150 (not shown in FIG. 1(A)) inside so as to hold the board 150. A width of the guide groove 113 (a distance in a vertical direction in FIG. 1(C)) is set so as to correspond to a thickness of the board 150 (not shown in FIG. 1(A)).

Plural of the connectors 100, each of which includes the above-discussed housing 110, are arranged so that the connectors 100 may be stacked on each other. An upper surface 114 and a bottom surface 115 of the housing 110 are respectively a first contact surface and a second contact surface which may come in contact with another connector 100 (not shown in FIG. 1(A)).

The first terminals 120 are fitted into insides of the first groves 111. In the example shown in FIG. 1(C), twenty-three (23) of the first terminals 120 are provided.

The second terminals 130 are fitted into insides of the second groves 112. In the example shown in FIG. 1(C), twenty-three (23) of the second terminals 130 are provided.

The first terminals 120 and the second terminals 130 are connected to wiring of the board 150 (not shown in FIG. 1(A)) guided by the guide groove 113. When plural of the connectors 100 are arranged so as to be stacked, the first terminals 120 are connected to the second terminals 130 of the connector 100 situated above, and the second terminals 130 are connected to the first terminals 120 of the connector 100 situated below.

Because of this, as shown in FIG. 1(D), the first terminals 120 project a little from (a short distance above) the upper surface 114 of the housing 110.

The fixing members 140 are configured to fix the board 150 (not shown in FIG. 1(A)) by pressing an upper surface of the board 150 (not shown in FIG. 1(A)) guided by the guide groove 113 in a thickness direction. The fixing members 140 are positioned so as to press the upper surface of the board 150 (not shown in FIG. 1(A)) in the thickness direction, relative to the position of the guide groove 113.

Four of the first terminals 120 among twenty-three of the first terminals 120 and four of the second terminals 130 among twenty-three of the second terminals 130 are shown in FIG. 2(A) and FIG. 2(B). In FIG. 2(A), the board 150 is inserted in the guide groove 113 of the connector 100. In the state where the board 150 is inserted in the guide groove 113, the board 150 is fixed by the fixing members 140. The board 150 shown in FIG. 2(A) is a portion of a board such as a PCB (Printed Circuit Board).

In the following, a connecting relationship in the state where the board 150 is inserted in the guide groove 113 of the connector 100 is discussed.

The first terminal 120 includes a lead 121 positioned at the upper surface 114 side of the housing 110 and a lead 122 for connection to an upper surface of the board 150. The lead 121 and the lead 122 are formed one at each end of the first terminal 120 and are parts of the first terminal 120. The lead 121 projects a little from the upper surface 114 of the housing 110. The lead 122 comes in contact with a pad 151 formed on the upper surface of the board 150.

The second terminal 130 includes a lead 131 positioned at the bottom surface 115 side of the housing 110 and a lead 132 for connection to a rear surface of the board 150. The lead 131 and the lead 132 are formed one at each end of the second terminal 130 and are parts of the second terminal 130. The lead 131 is provided in a position being offset (recessed) a little from the bottom surface 115 of the housing 110. The lead 132 comes in contact with a pad 152 formed on the rear surface of the board 150. The pad 151 and the pad 152 are connected to each other by a via plug (not shown in FIG. 2(C)). This structure is applied to all of pairs of the pads 151 and the pads 152 connected to the first terminal 120 and the second terminal 130.

An amount of offset (measurements in a height direction) of the lead 131 from the bottom surface 115 is smaller than a projecting amount (measurements in a height direction) of the lead 121 from the upper surface.

The lead 122 and the pad 151 are connected to each other by, for example, solder and the lead 132 and the pad 152 are connected to each other by, for example, solder.

Thus, the connector 100 can be easily fixed by inserting the board 150 into the guide groove 113. In addition, electrical connections between the pads 151 of the board 150 and the first terminals 120 and electrical connections between the pads 152 and the second terminals 130 can be easily made.

With this structure, compared to a conventional case where an electrical connection is made between the board and the connector by using the socket, connection can be easily made.

FIG. 2(C) shows a state where the first terminal 120 and the second terminal 130 are fitted into the first groove 111 and the second groove 112.

The first terminal 120 is a plate spring member bent between the lead 121 situated at one end and the lead 122 at another end. Because of this structure, when the lead 121 is pressed from an upper side, the plate spring member is bent (deflected). A spring constant of the first terminal 120 is set such that even if the first terminal 120 is pressed from an upper side of the housing 110 so as to be bent, the lead 121 projects relative to the upper surface 114 of the housing 100 and the projecting amount (measurements in the height direction) of the lead 121 is greater than the amount of offset (measurements in a height direction) of the lead 131 from the bottom surface 115. As a result of this, when the connectors 100 are stacked, connection between the lead 131 of the upper side connector 100 and the lead 121 of the lower side connector 100 can be made. The second terminal 130 has a substantially L-shaped configuration.

Next, a state where plural connectors 100 are arranged is discussed with reference to FIGS. 3(A)-3(C).

FIGS. 3(A)-3(C) are views showing an arrangement state of the connectors 100. More specifically, FIG. 3(A) is a side surface view. FIG. 3(B) is a perspective view of an upper side. FIG. 3(C) is a view showing a state shown in FIG. 3(A) of the first terminal 120 and the second terminal 130.

As shown in FIG. 3(A), two connectors 100A and 100B are provided at boards 150A and 150E of module type apparatuses 160A and 160B. Heights of the connectors 100A and 100b and the module type apparatuses 160A and 160B are equal to each other. The connectors 100A and 100B shown in FIGS. 3(A)-3(C) are the same as the connector 100 shown in FIG. 1(A)-FIG. 2(C).

The module type apparatuses 160A and 160B may be, for example, communication devices or information processing apparatuses, and have housings 161. The module type apparatuses 160A and 160B shown in FIG. 3(A) are connected to each other by a connecting part formed in the housing 161.

In the connector 100A, the board 150A is inserted in the guide groove 113 and fixed by the fixing member 140. In the connector 100B, the board 150B is inserted in the guide groove 113 and fixed by the fixing member 140.

FIG. 3(B) is a perspective view of the connectors 100A and 100b arranged with the boards 150A and 150B in the state shown in FIG. 3(A).

Furthermore, as shown in FIG. 3(C), in the second terminal 130A of the connector 100A and in the first terminal 120E of the connector 100B in the state shown in FIG. 3(A), the lead 131 of the second terminal 130A of the connector 100A comes in contact with the lead 121 of the first terminal 120B of the connector 100B. This structure is also applied to a case where other connectors 100 (not shown in FIG. 3(A)) are provided on/under the connector 100A/100B.

The first terminals 120A and 120E are plate spring members which project relative to the upper surface 114 of the housing 110. Therefore, when the connector 100A and the connector 100E are arranged where the bottom surface 115 of the housing 110 of the connector 100A and the upper surface 114 of the housing 110 of the connector 100B come in contact with each other, the first terminal 120B of the connector 110 is bent such that the plate spring member is compressed. As a result of this, the lead 121 of the first terminal 120B and the lead 131 of the second terminal 130A of the connector 100A are adhered to each other.

With this structure, electrical connection between the second terminal 130A of the connector 100A and the first terminal 120A of the connector 100B can be made. This is applied to all the twenty-three pairs of the first terminal 120 and the second terminal 130 shown in FIG. 1(A) and FIG. 1(B).

As shown in FIG. 3(A) through FIG. 3(C), the connector 100A and the connector 100B are stacked so that electrical connection is made. For example, each of the twenty-three pairs of the first terminal 120A and the second terminal 130A included in the connector 100A is connected to a signal line, an electric power source line, or a ground line of the board 150A. In addition, each of the twenty-three pairs of the first terminal 120B and the second terminal 130B included in the connector 100B is connected to a signal line, an electric power source line, or a ground line of the board 150B. By connecting the second terminal 130A and the first terminal 120B to each other for every corresponding line (either the single line, the electric power source line, or the ground line), it is possible to vertically connect the single lines, the electric power source lines, or the ground lines of plural of the module type apparatuses 160.

Next, arrangement of the module type apparatus 160 including the connector 100 is discussed with reference to FIGS. 4(A)-4(B). FIG. 4(A) is a view showing a connecting structure of the module type apparatus 160. FIG. 4(B) is a side surface view showing an arrangement method of the module type apparatus 160 including the connector 100.

As shown in FIG. 4(A) and FIG. 4(B), the module type apparatus 160A and the module type apparatus 160B include the housing 161A and the housing 161B, respectively. The board 150A and the board 150B are held inside the housing 161A and the housing 161B, respectively. A part of the board 150A and a part of the board 150B (indicated by a solid line in FIG. 4(B)) project relative to the housing 161A and the housing 161B. In other words, a part of the board 150A and a part of the board 150B (indicated by a dashed line in FIG. 4(B)) are positioned inside the housing 161A and the housing 161B.

A guide rail 162A is provided at an upper surface side of the housing 161A and a groove 163A is provided at a bottom surface side of the housing 161A. A guide rail 162B is provided at an upper surface side of the housing 161B and a groove 163B is provided at a bottom surface side of the housing 161B. The guide rail 162B and the groove 163A are configured to be engaged with each other. Furthermore, the guide rail 162A of the module type apparatus 160A is configured to be engaged with the groove 163 of the module type apparatus 160 situated above (not shown). The groove 163B is configured to be engaged with the guide rail 162 of the module type apparatus 160 situated below (not shown).

Because of this, as shown in FIG. 4(B), height H1 of the connector 100A is set to be equal to height H2 of housing 161A, and height H1 of the connector 100E is set to be equal to height H2 of housing 161B. By sliding the module type apparatus 160E relative to the module type apparatus 160A from a right side to a left side in FIG. 4(B) while the guide rail 162B is fitted into the groove 163A, the module type apparatus 160A and the module type apparatus 160B are engaged with each other and the connector 100A and the connector 100E are connected to each other as shown in FIG. 3(B).

The first terminal 120B of the connector 100B provided at the board 150B of the module type apparatus 160B comes in contact with the second terminal 130A of the connector 100A provided at the board 150A of the module type apparatus 160A. Therefore, by connecting the module type apparatus 160B to the module type apparatus 160A, it is possible to easily secure the electrical connection between the connector 100A and the connector 100B.

In the related art connector, the electrical connection is secure by engaging contacts of the connectors with each other in the height direction of the connector (the height H1 direction shown in FIG. 4(B)). However, in this embodiment, when the module type apparatuses 160 are slid so as be connected to each other, the electrical connection of the connectors 100 can be secured. Therefore, it is extremely easy to make connection between the connectors 100.

Thus, according to the connector 100 of the first embodiment, the board 150 can be easily fixed by simply inserting the board 150 into the guide groove 113 and electrical connection of the pads 151 and 152 of the board 150 and the first terminal 120 and the second terminal 130 can be easily secured.

Furthermore, in a state where the connector 100 is arranged at the module type apparatus 160, when the module type apparatuses 160 are connected to each other, electrical connection between the connectors 100 connected to the module type apparatuses 160 can be easily secured.

In the above-discussed embodiment, a structure where the housing 161A and the housing 161B include the guide rail 162A and the groove 163A and the guide rail 162B and the groove 163B is explained. However, a structure whereby the housing 161A and the housing 161B are slid so as to be engaged with each other is not limited to the guide rail 162A and the groove 163A and the guide rail 162E and the groove 163B.

Second Embodiment

A connector 200 of a second embodiment of the present invention is different from the connector 100 of the first embodiment in that a lead of the second terminal at the board side is connected to the upper surface side of the board 150 in the connector 200. In the connector 200 of the second embodiment, parts that are the same as the parts of the connector 100 of the first embodiment are given the same reference numerals, and explanation thereof is omitted. In the following explanation, different parts from the connector 100 of the first embodiment are mainly discussed.

FIG. 5(A) is a partial and expanded perspective view of the connector 200. FIG. 5(B) is an expanded side view showing the first terminal 120 and a second terminal 230.

The connector 200 of the second embodiment is different from the connector 100 of the first embodiment in that a structure of the second terminal 230 is different. The entire view of the connector 200 is substantially the same as the connector 100 of the first embodiment.

As shown in FIGS. 5(A) and 5(B), the second terminal 230 has a structure where a lead 232 connected to the board 150 is connected to the pad 152 provided on an upper surface of the board 150. Another lead 231 of the second terminal 230 is provided at the rear surface 115 side of the housing 110. The lead 231 is connected to the pad 152 by solder or the like.

As shown in FIG. 5(B), in the connector 200, the second terminal 230 which is an L-shaped type terminal, has two ends where the leads 231 and 232 are respectively formed.

Thus, by inserting the connector 200 where the lead 232 of the second terminal 230 is connected to the same surface relative to the board 150 as the lead 122 of the first terminal 120, as well as the connector 100 of the first embodiment, into the guide groove 113, the connector 200 can be easily fixed and electrical connection between the pads 151 and 152 of the board 150 and the first terminal 120 and the second terminal 230 can be easily secured.

Furthermore, where the connector 200 is arranged at the module type apparatus 160, when the module type apparatuses 160 are connected to each other, electrical connection between the connectors 200 connected to the module type apparatuses 160 can be easily secured.

Third Embodiment

A connector adaptor 300 of a third embodiment of the present invention is used for being inserted between a connector 100A and a connector 100B in a case where, as shown in FIG. 3(B), the connector 100A and the connector 100B are stacked.

In the following explanation, the connector 100 of the first embodiment or the connector 100A and the connector 100B are referred to.

In a case where two connectors are distinguished from each other, the connectors are indicated as the connector 100A and the connector 100B. In a case where it is not necessary to distinguish two connectors from each other and the connectors of the first embodiment are referred to, the connectors are indicated as the connectors 100.

Figure 6:
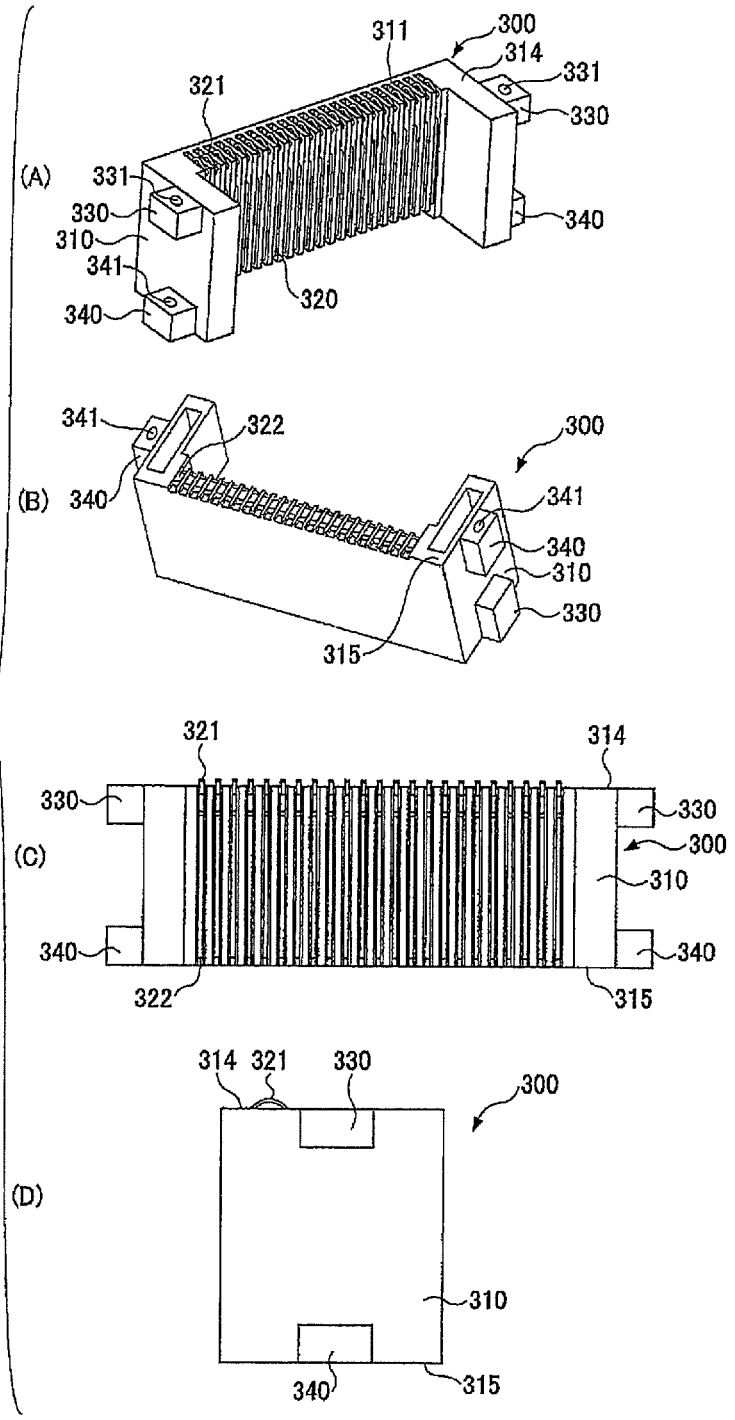
FIGS. 6(A)-6(D) are views of a connector adaptor 300 of a third embodiment of the present invention where

FIGS. 6(A)-6(D) are views of the connector adaptor 300 of the third embodiment of the present invention where FIG. 6(A) is a perspective view showing an upper surface side of the connector adaptor 300; FIG. 6(B) is a perspective view showing a bottom surface side of the connector adaptor 300; FIG. 6(C) is a front view of the connector adaptor 300; and FIG. 6(D) is a side view of the connector adaptor 300.

The connector adaptor 300 of the third embodiment includes a housing body 310, terminals 320, connecting parts 330, and connecting parts 340.

The housing body 310 is made by integral molding with an insulation material such as resin. Plural grooves 311 are formed in the housing body 310. Each of the grooves 311 is configured to receive one of the terminals 320. In an example shown in FIG. 6(C), twenty-three (23) terminals 320 and twenty-three (23) grooves 311 are provided. The grooves 311 are formed in parallel with each other.

In a case where the connector 100A and the connector 100B are stacked as shown in FIG. 3(B) of the first embodiment, the housing body 310 is inserted between the connector 100A and the connector 100B.

An upper surface 314 of the housing body 310 is configured to come in contact with the connector 100A. A bottom surface 315 of the housing body 310 is configured to come in contact with the connector 100B. More specifically, the upper surface 314 is a side contact surface which comes in contact with the bottom surface 115 of the connector 100 at a first side (upper end side) of the rectangular-shaped housing body 310. The bottom surface 315 is another side contact surface which comes in contact with the upper surface 114 of the connector 100 at a second side (lower end side) of the rectangular-shaped housing body 310.

The terminals 320 are fitted into insides of the grooves 311. In the example shown in FIG. 6(C), twenty-three (23) of the terminals 320 are provided.

The terminal 320 includes a lead 321 positioned at the upper end of the terminal 320 and a lead 322 positioned at the lower end of the terminal 320. When the connector adaptor 300 of the third embodiment is inserted between the connector 100A and the connector 100B of the first embodiment, the lead 321 comes in contact with the lead 131 of the connector 100 positioned at an upper side of the connector adaptor 300. Similarly, when the connector adaptor 300 of the third embodiment is inserted between the connector 100A and the connector 100B of the first embodiment, the lead 322 comes in contact with the lead 121 of the connector 100B positioned at a lower side of the connector adaptor 300.

As shown in FIG. 6(D), as well as the lead 121 of the connector 100 of the first embodiment, the lead 321 projects a little from the upper surface 314 of the housing body 310. The lead 322 is positioned a little toward the upper surface 314 side from the bottom surface 315 of the housing body 310.

The connecting parts 330 are portions projecting from upper parts of both side walls of the housing body 310 so as to be connected to the connector 100A positioned at an upper side of the connector adaptor 300. Screw holes 331 are formed in the connecting parts 330.

The connecting parts 340 are portions projecting from lower parts of the both side walls of the housing body 310 so as to be connected to the connector 100B positioned at a lower side of the connector adaptor 300. Screw holes 341 are formed in the connecting parts 340.

Figure 7:
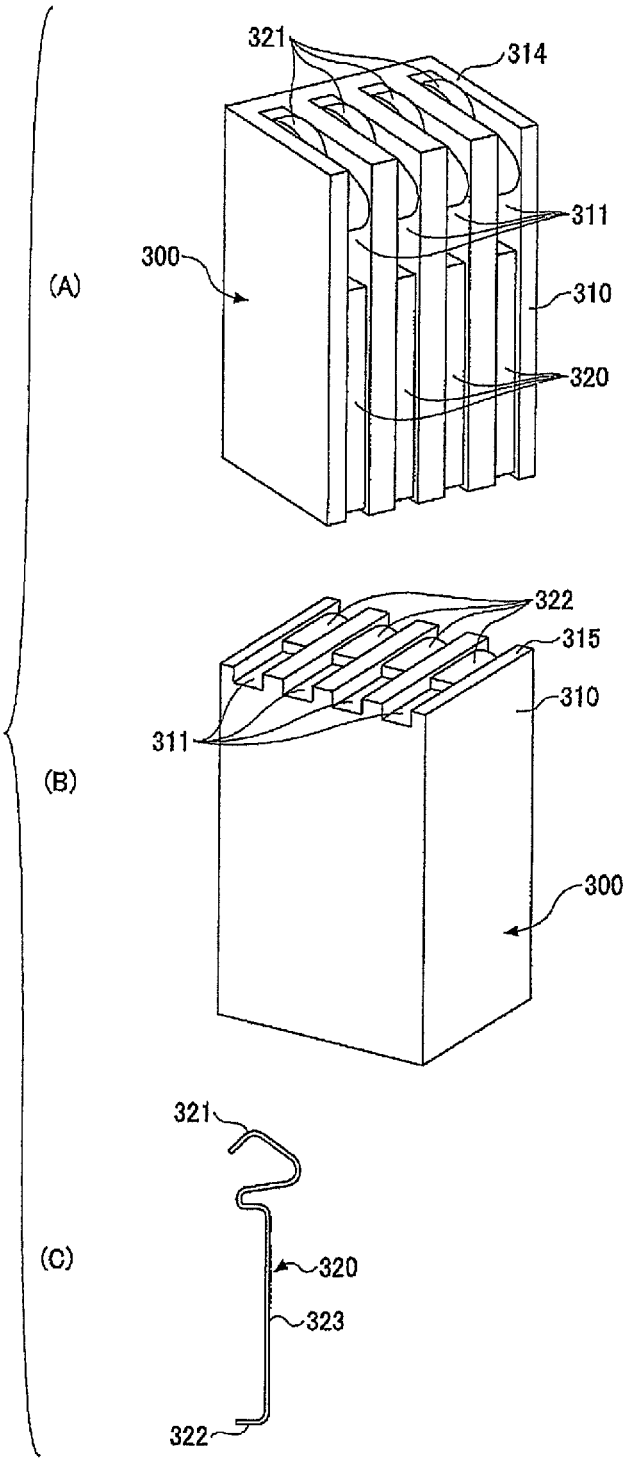
FIG. 7(A) is a partial and expanded perspective view showing an upper surface side of the connector adaptor 300.
FIG. 7(B) is a partial and expanded perspective view showing a bottom surface side of the connector adaptor 300.
FIG. 7(C) is an expanded side view showing terminals 320.

FIG. 7(A) is a partial and expanded perspective view showing an upper surface side of the connector adaptor 300; FIG. 7(B) is a partial and expanded perspective view showing a bottom surface side of the connector adaptor 300; and FIG. 7(C) is an expanded side view showing the terminal 320.

The connector adaptor shown in FIG. 7(A) and FIG. 7(B) corresponds to four terminals 320 among the twenty-three (23) terminals 320 shown in FIG. 6(C).

As shown in FIG. 7(A), the leads 321 project a little relative to the upper surface 314 of the housing body 310. In addition, as shown in FIG. 7(B), the leads 322 are positioned a little toward the upper surface 314 side from the bottom surface 315 of the housing body 310.

As shown in FIG. 7(C), the terminal 320 includes the lead 321 positioned at the upper surface 314 side of the housing body 310, the lead 322 positioned at the lower surface 315 side of the housing body 310, and a connecting part 323. The leads 321 and 322 are formed one at each end of the terminal 320 and are parts of the terminal 320. The connecting part 323 connects the lead 321 and lead 322 to each other.

A projecting amount (measurement in a height direction) of the lead 321 from the upper surface 314 is larger than an amount of offset (measurement in a height direction) of the lead 131 of the connector 100 from the bottom surface 115 of the housing 110 (see FIG. 2(B)).

An amount of offset (measurement in a height direction) of the lead 322 from the bottom surface 315 is smaller than a projecting amount (measurement in a height direction) of the lead 121 of the connector 100 from the upper surface 114 of the connector 100 (see FIG. 2(A)).

FIG. 7(C) shows the terminal 320 ready to be fitted into the groove 311.

The terminal 320 is a plate spring member where the lead 321 situated at one end and the lead 322 situated at another end are connected to each other by the connecting part 323. Because of this structure, when the lead 321 is pressed from an upper side, the plate spring member is bent (deflected).

A spring constant of the terminal 320 is set such that even if the terminal 320 is pressed from an upper side of the housing body 310 so as to be bent, the lead 321 projects relative to the upper surface 314 of the housing body 310 and the projecting amount (measurement in the height direction) of the lead 321 is greater than the amount of offset (measurement in a height direction) of the lead 131 of the connector 100 from the bottom surface 115. As a result of this, when the connector adaptor 300 is stacked below the connector 100, connection between the lead 131 of the upper side connector 100 and the lead 321 of the lower side connector adaptor 300 can be made, and thereby the electric connection can be secured.

Next, a state where plural connectors 100 are provided is discussed with reference to FIG. 8 and FIG. 9.

Figure 8:
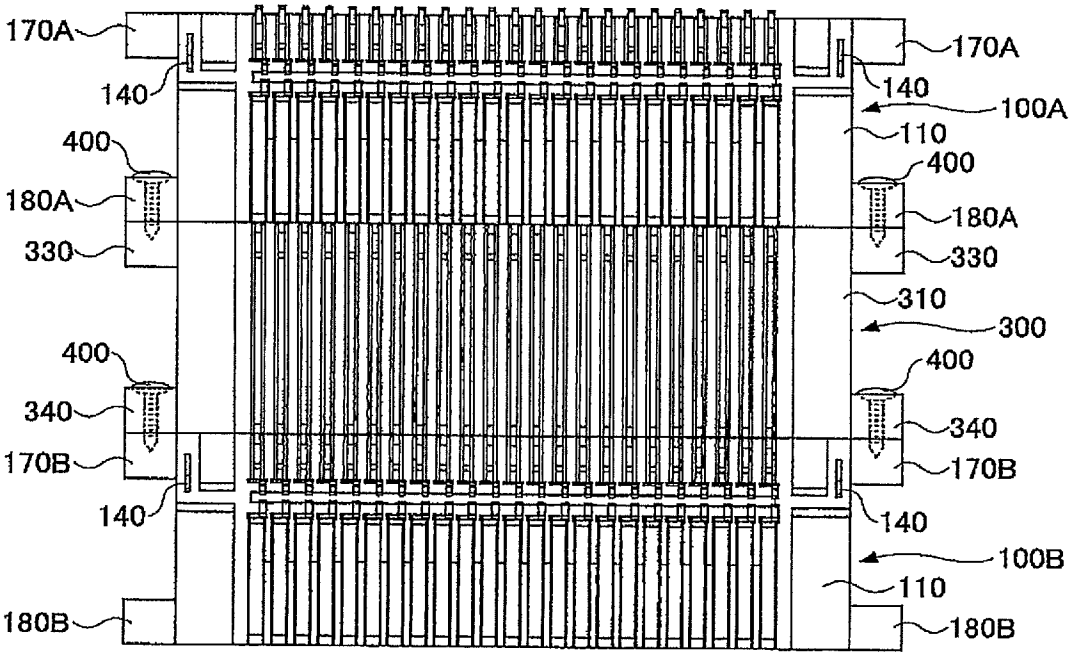
FIG. 8 is a front view showing a state where the connector adaptor 300 is provided between a connector 100A and a connector 100B.

FIG. 8 is a front view showing a state where the connector adaptor 300 is provided between a connector 100A and a connector 100B. FIG. 9 is a partial and expanded perspective view of the connector adaptor 300 shown in FIG. 8.

Figure 9:
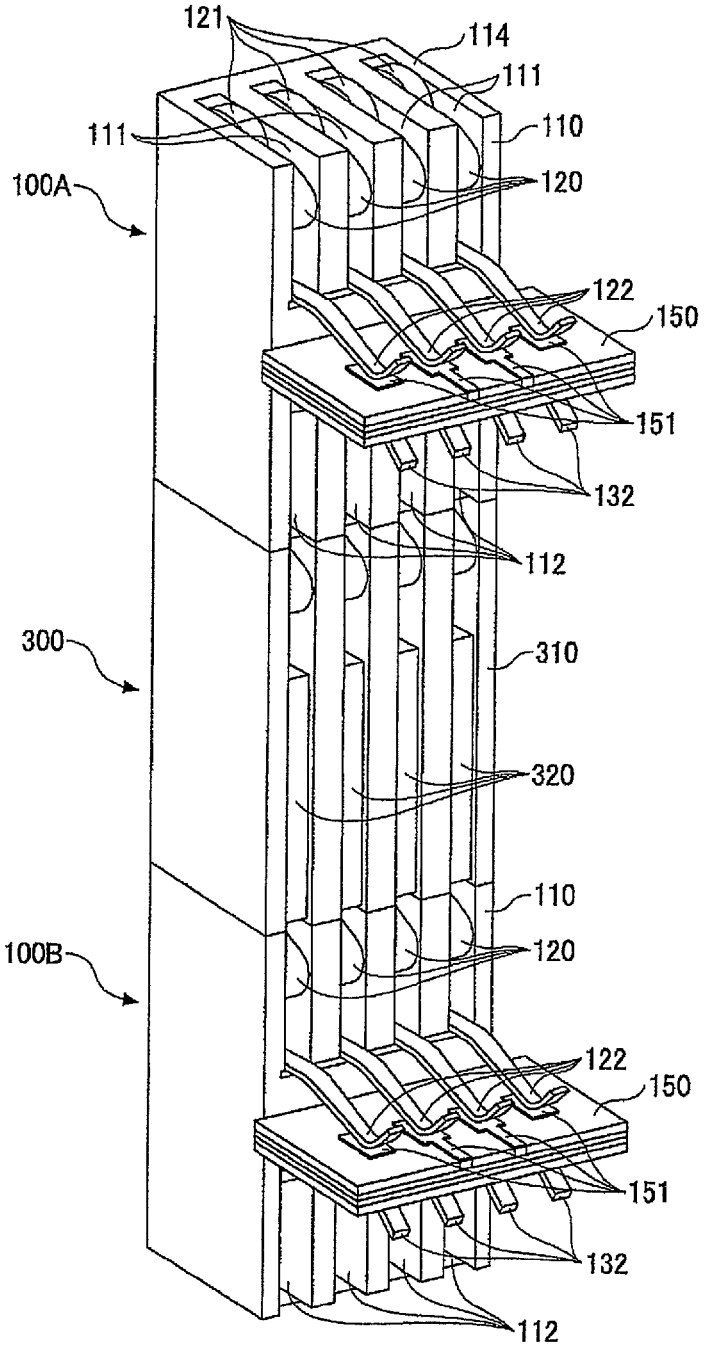
FIG. 9 is a partial and expanded perspective view of the connector adaptor 300 shown in FIG. 8.

FIG. 9 shows a portion of the connector 300, the portion corresponding to four terminals 320 of the twenty-three (23) terminals 320 shown in FIG. 8.

The connector 100A shown in FIG. 8 includes connecting parts 170A and connecting parts 180A configured to be connected to the connector adaptor 300. The connector 100B shown in FIG. 8 includes connecting parts 170B and connecting parts 180E configured to be connected to the connector adaptor 300.

The connecting parts 170A are portions projecting from upper parts of side walls of the housing 110 of the connector 100A. The connecting part 170A includes a screw hole (not shown) aligned with the screw hole 341 of the connecting part 340 of the connector adaptor 300. The connecting parts 170B are portions projecting from upper parts of side walls of the housing 110 of the connector 100B. The connecting part 170B includes a screw hole (not shown) aligned with the screw hole 341 of the connecting part 340 of the connector adaptor 300.

In the example shown in FIG. 8, the screw holes 341 of the connecting parts 340 of the connector adaptor 300 and the screw holes of the connecting parts 170B are screw-fixed so that the connector adaptor 300 and the connector 100B are fixed to each other.

The connecting parts 180A are portions projecting from lower parts of side walls of the housing 110 of the connector 100A. The connecting part 180A includes a screw hole (not shown) aligned with the screw hole 331 of the connecting part 330 of the connector adaptor 300. The connecting parts 180B are portions projecting from lower parts of side walls of the housing 110 of the connector 100B. The connecting part 180B includes a screw hole (not shown) aligned with the screw hole 331 of the connecting part 330 of the connector adaptor 300.

In the example shown in FIG. 8, the screw holes 331 of the connecting parts 330 of the connector adaptor 300 and the screw holes of the connecting parts 180A are screw-fixed so that the connector adaptor 300 and the connector 100A are fixed to each other.

When the connector adaptor 300 is fixed to the connector 100A and the connector 100b as shown in FIG. 8, as shown in FIG. 9, the lead 321 of the terminal 320 of the connector adaptor 300 (see FIG. 7(C)) is connected to the lead 131 of the second terminal 130 of the connector 100A (FIG. 2(C)). In addition, the lead 322 of the terminal 320 of the connector adaptor 300 (see FIG. 7(C)) is connected to the lead 121 of the first terminal 120 of the connector 100B (FIG. 2(C)).

The connector adaptor 300 of the third embodiment can be connected to the connectors 100 of the first embodiment in an optional way. While an electrical connection with the first terminal 120 and the second terminal 130 in vertical directions of plural connectors 100 is secured, the position of the connectors 100 in the height direction of the connectors 100 can be adjusted.

Because of this, the connector adaptor 300 can be used in a case where the positions of the connectors 100A and 100B in the height direction of the connectors 100A and 100B are expected to be adjusted.

The height of the connector adaptor 300 may be a height necessary for providing the connector adaptor 300 between the connector 100A and the connector 100B.

In the above-discussed embodiment, the connector adaptor 300 and the connectors 100A and 100B are screw-fixed by using the connecting parts 330 and 340 and the connecting parts 170A and 170B and 180A and 180B. However, the present invention is not limited to this example. For example, the connector adaptor 300 and the connectors 100A and 100B may be connected to each other by providing, for example, a rail.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

[1. A connector for a first wiring board of a first module type apparatus and a second wiring board of a second module type apparatus, the connector providing electrical connection between the first wiring board of the first module type apparatus and the second wiring board of the second module type apparatus when the first module type apparatus and the second module type apparatus are engaged with each other, the connector comprising:

a housing, the housing including a plurality of first grooves, a plurality of second grooves, the second grooves being formed in the same direction as a longitudinal direction of the first grooves, a first contact surface which comes in contact with another connector neighboring an end part side of the first grooves, and a second contact surface which comes in contact with another connector neighboring an end part side of the second grooves;

a first terminal received in one of the first grooves, the first terminal being bent between a first end and a second end, the first terminal including a projecting part, the projecting part being situated at the first end, the projecting part being configured to project from the first contact surface of the housing, and a plate spring where the second end is connected to a wiring of board; and a second terminal received in one of the second grooves, the second terminal being bent between a first end and a second end, the first end being provided in the vicinity of the second contact surface of the housing, the second end being connected to the wiring board.]

[2. The connector as claimed in claim 1, wherein the first end of the first terminal and the first end of the second terminal are connected to different surface sides of the wiring board.]

3. [The connector as claimed in claim 1,] *A connector for a first wiring board of a first module type apparatus and a second wiring board of a second module type apparatus, the connector providing electrical connection between the first wiring board of the first module type apparatus and the second wiring board of the second module type apparatus when the first module type apparatus and the second module type apparatus are engaged with each other, the connector comprising:*

*a housing, the housing including a plurality of first grooves, a plurality of second grooves, the second grooves being formed in the same direction as a longitudinal direction of the first grooves, a first contact surface which comes in contact with another connector neighboring an end part side of the first grooves, and a second contact surface which comes in contact with another connector neighboring an end part side of the second grooves;*

*a first terminal received in one of the first grooves, the first terminal being bent between a first end and a second end, the first terminal including a projecting part, the projecting part being situated at the first end, the projecting part being configured to project from the first contact surface of the housing, and a plate spring where the second end is connected to a wiring of board; and*

*a second terminal received in one of the second grooves, the second terminal being bent between a first end and a second end, the first end being provided in the vicinity of the second contact surface of the housing, the second end being connected to the wiring board,* wherein the [first] *second* end of the first terminal and the [first] *second* end of the second terminal are connected to a same surface side of the wiring board.

4. The connector as claimed in claim [1] *3*, wherein the housing includes a guide groove, the guide groove being configured to guide the wiring board inside so as to hold the wiring board.

5. The connector as claimed in claim 4, wherein the housing includes a fixing member, the fixing member being configured to press the wiring board guided inside the guide groove in a thickness direction so as to hold the wiring board.

6. A connector adaptor provided at the first contact surface side or the second contact surface side of the housing of the connector as claimed in claim [1] *3*, the connector adaptor comprising:

a housing body, the housing body including a plurality of grooves, a side contact surface which comes in contact with the connector neighboring a first end part of the grooves, another side contact surface which conies in contact with the connector neighboring a second end part of the grooves; and a terminal received in one of the grooves which terminal comes in contact with the first terminal or the second terminal of the connector at the side contact surface or the other side contact surface of the housing body.

*7. A connector that holds a wiring board and is electrically connectable to another connector at both ends thereof, the connector comprising:*

*a housing that includes a first contact surface provided at one end capable to come in contact with another connector, a second contact surface provided at other end capable to come in contact with another connector, and grooves formed in the housing in the same direction, respectively, wherein the first contact surface and the second contact surface have portions of the grooves formed therein;*

*first terminals each of which is received in one of the grooves, each of the first terminals being bent between a first end and a second end, the first terminal including a projecting part being situated at the first end and being configured to project from the first contact surface, and the second end configured to be connected to the wiring board; and*

*second terminals each of which is received in one of the grooves, each of the second terminals being bent between a first end and a second end, the second terminal including a recessed part being situated at the first end and being configured to be recessed from the second contact surface, and the second end configured to be connected to the wiring board,*

*wherein the first contact surface is configured to be engaged with the second contact surface of another connector upon being slid thereover in a direction in which the grooves extend on the first contact surface, and the second contact surface is configured to be engaged with the first contact surface of another connector upon being slid thereover in a direction in which the grooves extend on the second contact surface.*

*8. The connector as claimed in claim 7, wherein the second end of the first terminal and the second end of the second terminal are configured to be connected to different surfaces of the wiring board, respectively.*

*9. The connector as claimed in claim 7, wherein the second end of the first terminal and the second end of the second terminal are configured to be connected to a same surface of the wiring board.*

*10. The connector as claimed in claim 7, wherein the housing includes a fixing member configured to fix the wiring board.*

*11. A connector adaptor connectable between a first connector and a second connector, the connector adaptor comprising:*

*a housing body that includes*

*a first contact surface provided at one end of the housing body, capable to come in contact with the first connector,*

*a second contact surface provided at the other end of the housing body, capable to come in contact with the second connector, and*

*grooves provided in the housing body between the first contact surface and the second contact surface; and*

*terminals each of which is received in a respective groove among the grooves, wherein each terminal in the respective groove includes a first part provided at and protruding from a rim of the respective groove on the first contact surface that comes in contact with a terminal of the first connector, and a second part provided at and recessed from a rim of the respective groove on the second contact surface that comes in contact with a terminal of the second connector.*

* * * * *